(12) United States Patent
Spangenberg Hansen et al.

(10) Patent No.: US 7,518,079 B2
(45) Date of Patent: Apr. 14, 2009

(54) METHOD OF SORTING PAVING STONES

(75) Inventors: Erik Spangenberg Hansen, Oestbirk (DK); Kjeld Andersen, Kjellerup (DK)

(73) Assignee: KVM Industrimaskiner A/S, Kjellerup (DK)

( * ) Notice: Subject to any disclaimer, the term of this patent is extended or adjusted under 35 U.S.C. 154(b) by 60 days.

(21) Appl. No.: 10/554,737

(22) PCT Filed: Apr. 17, 2004

(86) PCT No.: PCT/DK2004/000272

§ 371 (c)(1),
(2), (4) Date: Mar. 19, 2007

(87) PCT Pub. No.: WO2004/096455

PCT Pub. Date: Nov. 11, 2004

(65) Prior Publication Data

US 2007/0262001 A1  Nov. 15, 2007

(30) Foreign Application Priority Data

Apr. 28, 2003  (DK) ............................ 2003 00636

(51) Int. Cl.
*B07C 5/00* (2006.01)
(52) U.S. Cl. ...................... 209/576; 209/577; 209/578; 209/586
(58) Field of Classification Search ............... 209/539, 209/576, 580, 586, 651, 653, 922, 923
See application file for complete search history.

(56) References Cited

U.S. PATENT DOCUMENTS 3,189,177 A  6/1965  Mays et al.

(Continued)

FOREIGN PATENT DOCUMENTS

DE  2809803 A1  9/1978

(Continued)

OTHER PUBLICATIONS

Denmark Search Report for PA 2003 00636.

(Continued)

*Primary Examiner*—Patrick H Mackey
*Assistant Examiner*—Terrell H Matthews
(74) *Attorney, Agent, or Firm*—David S. Safran; Roberts Mlotkowski Safran & Cole, P.C.

(57) ABSTRACT

Use of more exotic laying patterns in connection with establishing paving stones of concrete blocks for e.g. paving on yards, are not widely used for cost reasons, as the automated laying machines laying the said paving stones in large surfaces at a time require the stones to be delivered in palletised formats which are handled by machine. The only way in which the said stereotype formats can be laid by machine is, if the paving stones are supplied manually, patterned layers on pallets. There is thus indicated a method for automatic sorting of paving stones (2) of different size from bulk condition to e.g. patterned laid palletisable layers in a standard out format, as the stones (2) after being guided into a row (3) are registered by size by a vision based system and guided into arraying lanes (34) from where these may selectively be dispensed in the preferred laying patterns in the said out formats (22). Hereby is achieved a considerable reduction of the costs for establishing paving stones in exotic laying patterns, and it becomes furthermore possible to perform sorting of "rumbled" paving stones.

6 Claims, 3 Drawing Sheets

U.S. PATENT DOCUMENTS

| | | | |
|---|---|---|---|
| 3,656,635 A * | 4/1972 | Schafer et al. | 414/796 |
| 3,666,093 A * | 5/1972 | Thornton et al. | 209/586 |
| 3,747,755 A | 7/1973 | Senturia et al. | |
| 4,014,441 A * | 3/1977 | Osborn et al. | 414/788.6 |
| 4,273,489 A * | 6/1981 | Lingl et al. | 198/418.2 |
| 4,423,807 A * | 1/1984 | Muller | 198/419.1 |
| 6,380,503 B1 | 4/2002 | Mills et al. | |
| 2005/0056521 A1* | 3/2005 | Keyes | 198/418.5 |
| 2006/0131129 A1* | 6/2006 | McNear | 198/373 |

FOREIGN PATENT DOCUMENTS

| | | |
|---|---|---|
| DE | 9117221 U1 | 10/1997 |
| EP | 0067147 A1 | 12/1982 |
| EP | 0256169 A1 | 2/1988 |
| EP | 0640721 A1 | 3/1995 |
| GB | 2192417 A | 1/1988 |
| WO | 02/060605 A1 | 8/2002 |

OTHER PUBLICATIONS

International Search Report for International Application No. PCT/NO2004/000272.

* cited by examiner

METHOD OF SORTING PAVING STONES

BACKGROUND OF THE INVENTION

The present invention concerns a method for sorting paving stones and automating laying patterns of paving stones.

Paving stones are cast in the best and most rational way according to a pattern that utilises the possible casting area optimally, and this is rarely the pattern in which the paving stones are desired to be laid.

An example of paving stones being cast in the most rational format for utilising the casting area optimally is indicated in FIG. 1. After finishing curing in the plant, typically next day, the stones are moved over to the sorting arrangement and are conveyed in rows to the sorting unit. In that connection it will be possible to perform a sorting of respective stone sizes in rows that subsequently are stacked/palletised mechanically by means of a palletising machine.

By establishing pavement with paving stones (in the following also denoted "laying of paving stones") it may be preferred to combine paving stones in several different formats and/or colours in specially selected laying patterns.

Since casting of paving stones in the traditionally used casting equipment takes place by adding only one type of concrete/colour at a time, laying of paving stones in combinations of colours and with different formats will require that the said types of stones to a preferred paving pattern are delivered separately on pallets or in bulk to the site of laying, and from where individual stones are taken during manual laying of the laying stones in the preferred embodiment. This implies that establishing the said, slightly more exotic paving pattern combinations, including combinations of shape and colour, become relatively expensive compared with more stereotypically looking types of paving with uniform stone size and colour which can be laid by machine, about 1 m² at a time, with consequent savings in wages.

Laying of pattern laid paving stones may also occur, but the preferred laying pattern of stones in different format/colours has here been laid manually on a pallet, entailing a considerable increase of the production costs and thereby the cost of acquiring these stones compared with palletised stone types of identical format.

In some cases, new paving stones are imparted an aged appearance, which is made by a process denoted 'rumbling' in the paving stone industry, where the paving stones are placed in random order in a rotating drum, whereby the stones knocks against each other and thereby treat each other so that the aged appearance is produced.

After the process, it will be necessary to arrange the stones in a way so that they are uniformly oriented and in one row. For the same size of stones it is sufficient that laying units are generated that subsequently can be palletised/stacked by machine in the usual way.

However, if the artificially aged stones are of different size/format, but with the same thickness, which with regard to the utilisation of the casting area, cf. FIG. 1 before the rumbling is preferred, after guiding into a row, the different stone sizes will come out in random order after the artificial aging process, and thus a manual sorting of the "rumbled" stones according to size is to occur. The alternative to that is that respective stone sizes are "rumbled" separately and are subsequently sorted out and palletised, but with regard to utilising the casting area more optimally, i.e. to be able to cast different stone sizes in the same casting equipment and to perform the said ageing process for these for lastly performing machine palletising of these in pre-selected patterns, or separately, it will be preferred to enable sorting of the individual stone units into size categories before an actual palletising/stacking takes place.

Guiding arrangements for paving stones in bulk condition subsequent to the above ageing process are known where the stones during conveying are guided in on a long row with the stones lying uniformly oriented and not standing on an edge. This form of sorting is suitable and useful in connection with subsequent palletising of stones with identical size and thickness but not suited for use by sorting stones with different sizes and colours with the purpose of succeeding machine palletising, and is not suited either for application to automated laying of paving stones with different sizes in laying patterns.

In connection with providing an automated solution to the above problems, by the invention it has been acknowledged that the crucial problem is to perform an automated sorting of the paving stones in sizes and in such a way that succeeding dispensing of the stone items may easily be performed.

It is thus the purpose of the present invention to provide a method for sorting paving stones from bulk condition, which according to the invention is achieved by a method that includes conveying and guiding individual paving stones into a successive row; separating individual paving stones, typically the paving stone being at front at any time in relation to the conveying direction; determining the size and quality of a relevant paving stone, alternatively size, colour and quality, by a vision based detection system; transferring relevant paving stones determined by size with the same orientation for relevant lanes with individual advancing system for paving stone items with same size and/or size and colour, for advancing these against a stop, alternatively discarding the item.

Hereby there is achieved a sorting of the paving stone items according to size in such a way that a subsequent dispensing of the stone items may easily be performed.

After guiding the paving stone items into a long row, typically with the mutually facing side abutting on each other, a sorting of the paving stone items is performed by the stone size being detected by means of a vision system or by means of sensors mounted above the lane. Furthermore, it will be possible to detect the colour of a relevant paving stone if a colour camera is used in the vision system.

Before a relevant paving stone from the guided row is subjected to detection of size and possible colour, this has been separated in beforehand at a suitable distance from the other items in the guided row so that detection can take place. This may in practice be done by the conveying speed for the lane under the vision system/sensors having a higher speed than the previous conveying lane. The vision system or the sensors decide which stone size is situated in the detecting area and in case that the vision system includes a colour camera, also the colour of the relevant paving stone item.

After detection, the paving stone determined by size to the arraying lane relevant for the size and/or colour and size, and is pushed/drawn over into the row/lane concerned.

Respective lanes include each their individual conveying system, e.g. on lanes with freely rotating rollers with appropriate inclination (gravitational principle) so that the stone are always running forward to a stop at the end of the lane. In theory, there may be an unlimited number of different sizes, but there will typically be 3-8 different sorting rows.

If a vision system is used, both orientation and stone size can be decided exactly.

After the paving stone items have now been sorted and arrayed in rows with uniform orientation and size and possible colour, it will be possible to perform a dispensing of the stone items in rows in format desired in advance of paving stone items of uniform size/colour for further palletising.

However, the fact that the paving stone items have now been sorted and arrayed in rows as specified above comprises further possibilities for handling, and by the invention it has been ascertained that the automating the build-up of laying patterns of paving stones with mutually deviating format is hence possible in that, in continuation of the above, already specified process steps, to perform further process steps, including dispensing of the sorted rows paving stone items arrayed in respective lanes to a transport device oriented transversely of the lanes into a predetermined or randomly chosen sequence for forming a row of the paving stone items in a given modular width that fit to a predetermined, alternatively a random, laying pattern; compressing the formed row of paving stone items so that the mutually facing lateral faces are in mutual contact; performing a lateral displacement of the formed row of paving stones by the transverse transport device; displacing the row of paving stones from the transverse transport device to a collecting table; repeating the above further process steps until a preferred out format of paving stones has been collected on the collecting table; conveying the paving stones in the out format to a stacking/palletising unit.

By the further process steps, the combination of different sizes of stones needed to form a row of the laying patter is taken out from the arraying lanes by opening the stop for the different lanes in the sequence in which they are to lie in the laying pattern. Each stone is taken out and advanced on a transverse lane to the side until the next stone is taken out. When the last stone has been taken out to a full row, the entire row is run free of the pattern generator, and a new laying pattern row is formed, while in the meantime, the finished row is moved forward and is pushed together so that the facing sides of the stones are in contact with each other, after which they are laterally displaced one width of a row over upon a collecting table, in order to make room for the next row.

When a sufficient number of row corresponding to the layer in the size of the out format, they are moved free of the collecting table and a stacking arrangement (a palletiser) picks up the layer and forms stacks of paving stones with the laying pattern of the out format.

If one or more stone sizes are not to be used, or are only used to a lesser extent, in the final laying format, the method may include that these stone which are not used or are in excess are brought further on to a collecting area from where they may either be stacked or be sent back to the sorting system via a collecting/accumulating lane/advancing arrangement.

If a colour camera is used in the vision system, different colours may also be detected on and the different colours may be sorted into each their sorting row for forming a certain colour pattern.

The vision system may also be used for quality control where only one camera is used, there may be detected on the surface facing the camera, but if two or more cameras are used, there may, if disposition and lighting are properly selected, it may be detected if all edges are within acceptable limits.

The vision system may therefore detect stones that have got their edges knocked too much off by the artificial ageing process, and by suitable programming of accept criteria in a control unit communicating with the vision system, a plant arranged according to the method of the invention may be adapted so that it may separate these stone items and bring these to a container for discarded stones so that these do not form part of the finished product.

If a system of sensors is used for detecting the stone sizes, the number of sensors being, active simultaneously are detected. The sensor system only giving rise to a simple sorting also require that if a reasonable little detection time/sorting time is to be achieved, there is to be a certain difference in size of the stones to be detected.

By the invention it has been acknowledged that performing the method according to the invention for detecting size as well as orientation of the paving stones will require use of a large amount of sensors for ensuring that both orientation and size are to be detected properly.

At the end of respecting sorting rows, a stop device is sitting, ensuring that the stones only get out according to a controlled pattern.

The pattern generation itself occurs by pushing out a stone from a certain row on the transverse transport device, and this stone is then run towards the front end of the collecting table. If the next stone is to come from a row passed by the pushed out stone, it is awaited that the stone has passed the row where the next stone is to come from. If the next stone is to come from a row lying before the actual stone, the next stove may immediately be pushed out and follow along towards the collecting table.

The sequence of the pushing out of stones may either occur according to a predetermined, e.g. customer determined, sequential process or, if the stone sizes allow, according to a randomised selection that may be controlled according to how full the sorting rows are and thus maintain an approximately uniform filling of the collecting rows.

When a sufficient number of stones has been pushed out from the collecting row, they are advanced on the collecting table, and it is ensured that they are completely pushed together before they are displaced laterally to form the laying format desired.

When the entire laying format is formed in the preferred out format, this is moved free of the collecting table so that there is room for a palletiser or other kind of stacking arrangement to move the layer over upon a stack.

The stack may be made on a stack lane, either on a transport pallet or directly on a stack lane that allow strapping or other kind of safeguarding the stability of the pack during further transport to the consumer, as the mentioned stacks and packing processes are known ways of handling and packing paving stones.

Hereby is provided a method for fully automated sorting and dispensing and palletising paving stones in bulk condition into laying patterns that are desired in advance or random.

DESCRIPTION OF THE DRAWING

The invention is explained in the following with reference to the drawing, where:

In FIG. 1 is seen examples of different casting formats 1 of paving stones 2. Most often, the format is designed so that the casting area is utilised optimally in relation to the casting machine. The formats 1 may, as outlined, be constituted by uniformly shaped rectangular or quadratic items 2. Alternatively, the casting format can be constituted by combinations of whole stones, like ⅔ stone, ½ stone and as ⅓ stone, sorted into each their row A, B, C, D, or there may be used casting formats with combinations of stone sizes in each row.

Figure 1:
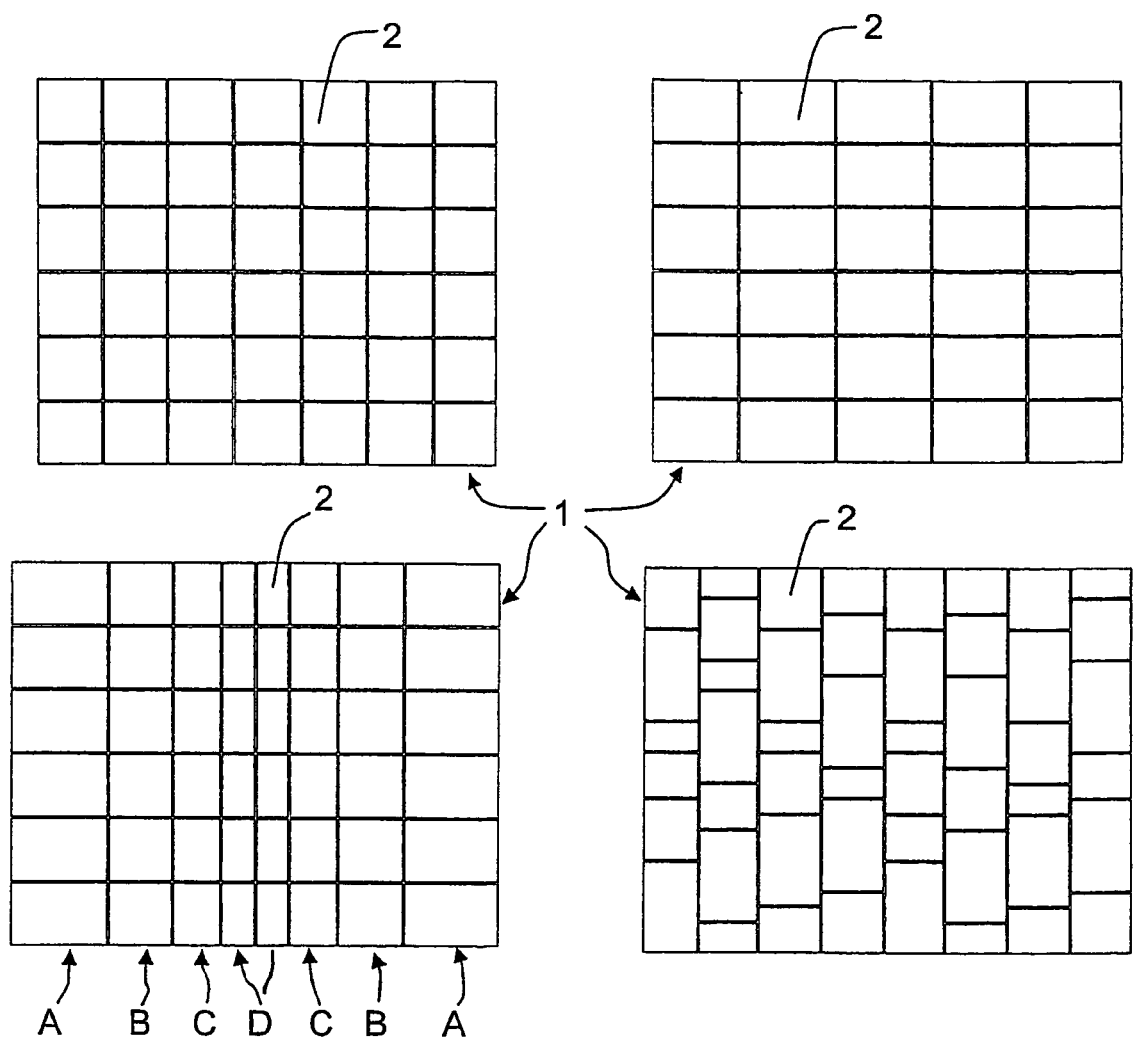
FIG. 1 shows examples of different casting formats of paving stones.
Figure 2:
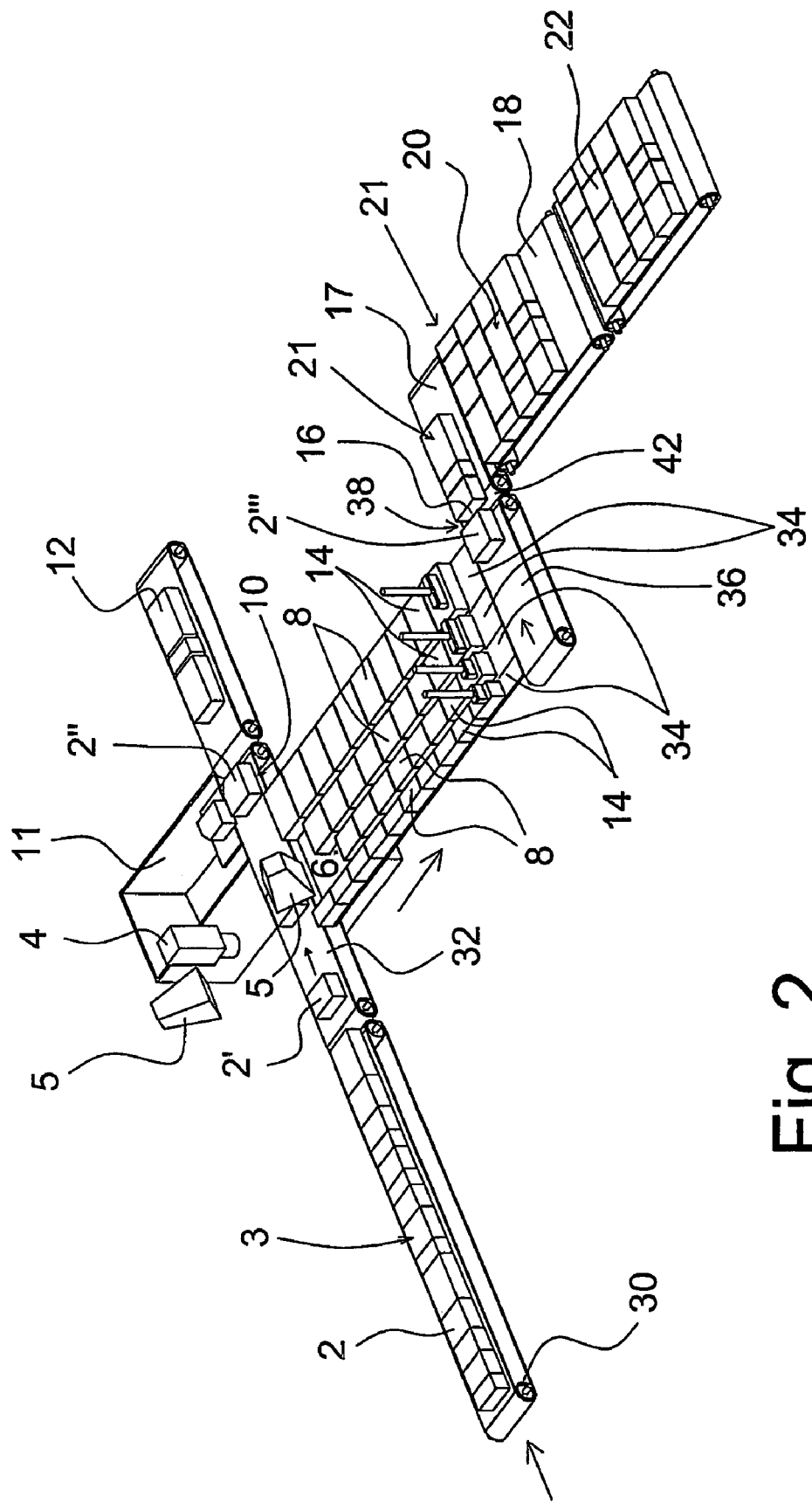
FIG. 2 shows schematically a method for sorting paving stone items according to the invention, where the paving stones to be sorted are all having the same width, but different length.

On FIG. 2 is seen the row of uniformly oriented stones 2 that come down from a not shown dividing equipment that divide the rows from the cast format down to individual rows or from an orientation arrangement from an artificial ageing equipment. The shown row of stones may just as well be "rumbled" and by a not shown conveying and guiding equipment be guided into the shown row 3 of stone items 2.

The stones are advanced by a conveying equipment 30 and delivered to a second conveying equipment 32 that bring the stones 2' one by one to a detecting equipment in the form of a vision system which in the shown embodiment includes a camera 4 and light emitters 5, where stone size/orientation/quality and possibly colour of the actual stone 2' is detected.

After detection by the camera 4 occurring during conveying of the stone 2', this is moved on until it is located opposite to the lane 34 in the sorting system 6 relevant for the particular stone size, after which the stone 2' is moved transversely into the relevant lane 34 where the stone items are disposed in sorting rows 8 in the shown embodiment.

The arraying lanes move the stones 34 in rows against the stop arrangement 14 at the end of each arraying lane 34. If the lane in question is full, or the stone in question is of a type not to be used to a great extent, the stone continues to an accumulation/return system 12. The stone may here either be accumulated together with other corresponding stones, or be returned to the conveying system 2.

If the vision system is also used for quality control, a stone 2" that do not fulfil the quality requirements can be moved to a separation unit 10, where the stone 2" is removed. In the shown embodiment, the stone 2" is brought to a container 11 for rejected items. Particularly in the case of artificially aged stones, the probability of occurrence of separated stone items will be greater than for stones not having gone through the said process. But the vision system may also reveal stones that miss an edge or a bevelling on one or more sides, or have unwanted holes, whereby the stone does not fulfil the quality requirements.

The pattern generation of the stones 2 occurs by controlling the stop arrangement 14 at the end of the individual lanes 34 which are thus opened for discharging a stone 2''' according to a determined sequence. The sequence can be customer determined, or it may be fixed for the stone types in the sorting rows 8 of the arraying lanes, or it may, if the stone size allow for it, be determined by the degree of filling of the sorting rows.

When dispensing stone items 2''' from the arraying rows, the relevant stop arrangement 14 and allows a single stone 2''' to come out from the sorted row 8, the stop arrangement 14 is closed immediately after a single stone 2" has come out.

The stone 2''' which has just come out is moved free of the sorted row 8 before it is advanced by a transversely disposed transport device 36 towards the front end 38 of a assembling table 17 on the conveying system 16 in front of the stop arrangement 14. If the next stone to be used in the pattern is to come from a sorting row 8 which the just selected stone 2''' is to pass from its way to the assembling table 17, ejection of the next stone for the pattern is awaited until the just selected stone 2''' has passed the sorted row 8 before it is selected. If the next stone to be used in the pattern comes from a sorted row 8 which is not to be passed, the next stone may immediately be selected and follow along towards the assembling table 17. When the desired number of stones for the row 38 in question in the pattern is selected, all stones in the row are moved together on the assembling table 17 so that their mutually facing sides are abutting on each other, and then completely to the end on the assembling table 17 where it is continuously ensured that the stones forming part of the row are entirely assembled.

When the stones are entirely forward to the end and assembled, they are displaced transversely against a collecting table 18, where the laying pattern 20 is formed as the collapsed rows 21 of stones are supplied to the collecting table 18.

When the desired number of rows 21 of collapsed stones are moved forward on the collecting table to the desired laying pattern, the full out format 22 with the desired stone patter is brought to a not shown palletising arrangement which then stacks the finished laying patterns 20, while the collecting table 18 begins reception of new rows 21 of collapsed combinations of stones from the assembling table 17.

Figure 3:
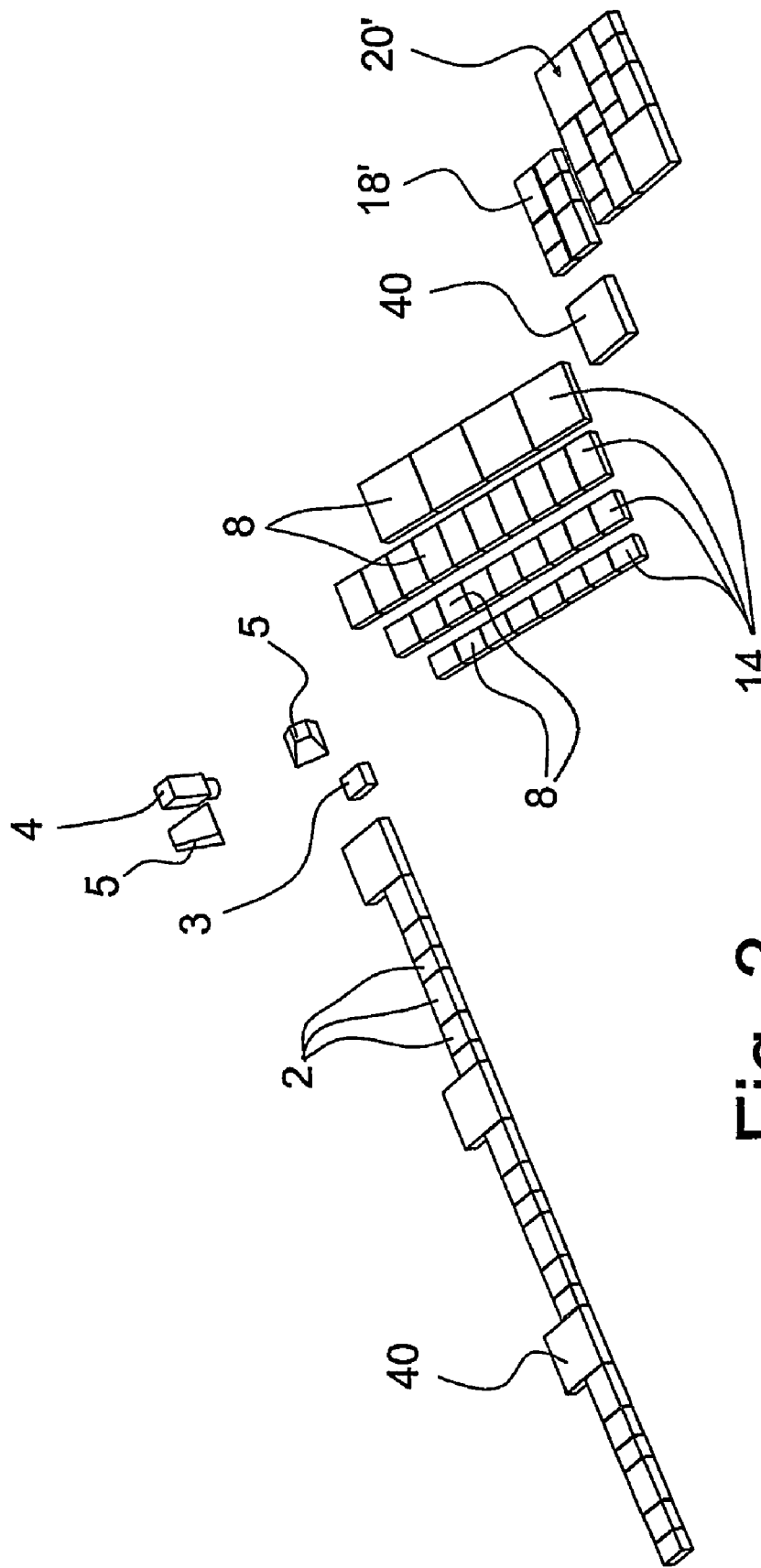
FIG. 3 shows a second embodiment of the method according to the invention, where the paving stones to be sorted do not have the same width and at the same time different lengths.

In FIG. 3 is seen a realisation of the method according to the invention by using a corresponding vision equipment for detecting and sorting stones, but the stones are here both of different length and different width. On FIG. 3, separation of discarded items 10 and 11 and collecting lane/accumulating lane 12 are not shown. The detection itself and sorting of the stones occur in the same way.

The pattern structure is slightly different as provision is to be made for if more rows 18' of the narrow stones 2 are to be made before and/or after the double-width stones 40 are to be selected. In principle, the broad stones 40 can be twice or more as wide as the other stones 2, the formats are just to fit together so that a pattern 20' may be formed which can be handled in the succeeding, not shown palletising arrangement.

It is to be mentioned that the casting formats used for stones in connection with the method may also occur so that casting of uniform size stone is performed separately so that the detecting equipment is supplied paving stones from several different castings, where the vision based sorting system is then combining these different sizes together to a desired laying format.

LIST OF REFERENCE NUMBERS 1 casting format
2 stone
2' separated stone to be detected
2" discarded stone
2''' dispensed stone for laying pattern
3 row with uniformly oriented paving stones for detecting
4 detecting system, camera
5, 5' detecting system, light emitter
6 sorting arrangement
8 sorting row
10 discarded items
11 container for discarded items
12 collecting/return system
14 stop arrangement
16 transverse lane
17 assembling table
18 collecting table
20 laying pattern
21 row of collapsed stone combinations
22 out format
30 first advancing equipment
32 second advancing equipment
34 arraying lanes for sorting rows 8
36 transverse conveying device 38 front end of assembling table 17
40 wider stone item

The invention claimed is:

1. A method of sorting paving stones from bulk condition by performing the following process steps:
   a) conveying and guiding individual paving stones (2) into a successive row (3);
   b) separating individual paving stones (2, 2'), typically the paving stone (2') being at front at any time in relation to the conveying direction;
   c) determining the size and quality of a relevant paving stone;
   d) transferring relevant paving stones determined by size with the same orientation for relevant lanes (34) with individual advancing system for paving stone items with same size and/or size and colour, for advancing these against a stop;
   e) dispensing of the sorted rows (8) of paving stone items arrayed in respective lanes (34) to a transport device (36) oriented transversely of the lanes into a predetermined or randomly chosen sequence for forming a row of the paving stone items in a given modular width that fit to a selected laying pattern (38);
   f) compressing the formed row (21) of paving stone items so that the mutually facing lateral faces are in mutual contact;
   g) performing a lateral displacement of the formed row of paving stones (21) by the transverse transport device;
   h) displacing the row of paving stones from the transverse transport device (36) to a collecting table (18);
   i) repeating the process steps e)-h) until a preferred out format (22) of paving stones has been collected on the collecting table (18);
   j) conveying the paving stones in the out format (22) to a stacking/palletising unit.

2. The method of sorting paving stones according to claim 1, wherein stones that do not fulfill quality requirements are moved to a separation unit where the stones are removed during said transferring step.

3. The method of sorting paving stones according to claim 1, wherein said selected laying pattern is a random laying pattern.

4. The method of sorting paving stones according to claim 1, wherein color is also determined by said vision based detection system during said determining step.

5. The method of sorting paving stones according to claim 4, wherein stones that do not fulfill quality requirements are moved to a separation unit where the stones are removed during said transferring step.

6. The method of sorting paving stones according to claim 5, wherein said selected laying pattern is a random laying pattern.

* * * * *